May 3, 1966  P. D. SANTILHANO  3,249,733
ELECTRO-SLAG WELDING APPARATUS
Filed Dec. 20, 1963  5 Sheets-Sheet 1

Inventor
Philip D. Santilhano
By *J. P. Moran*
Attorney

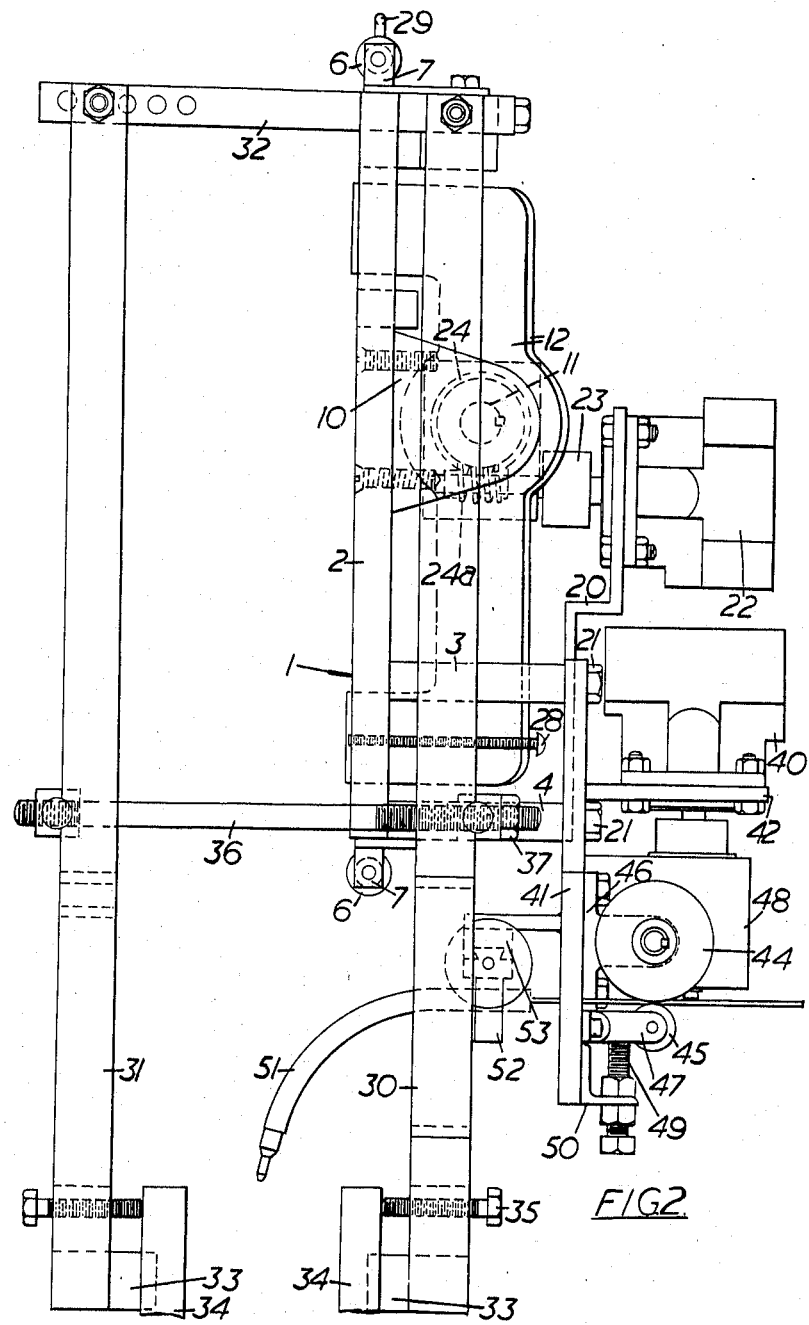

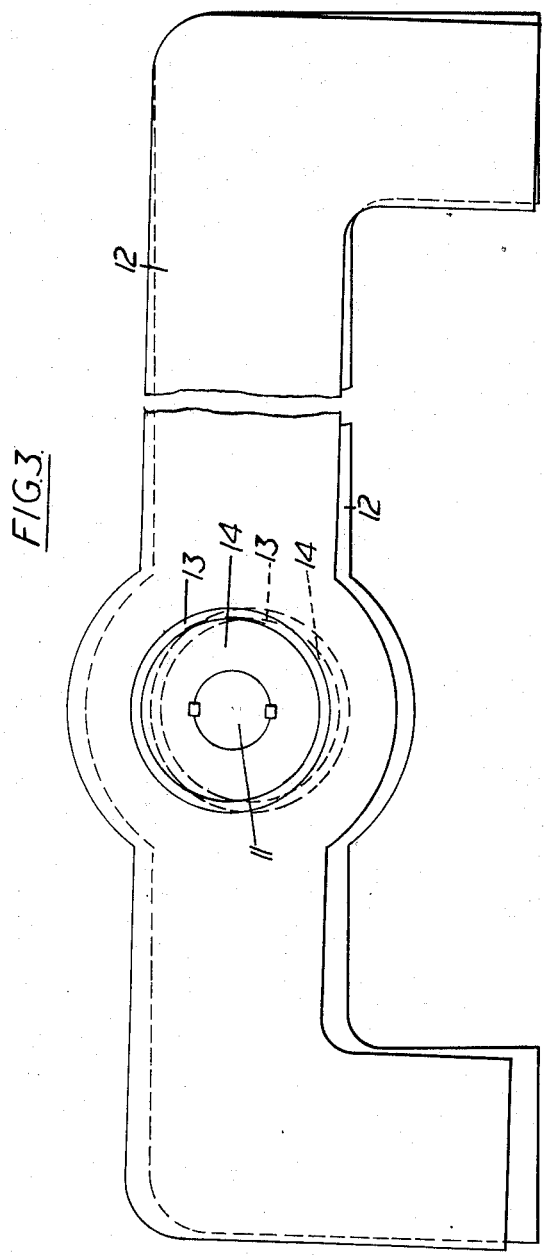

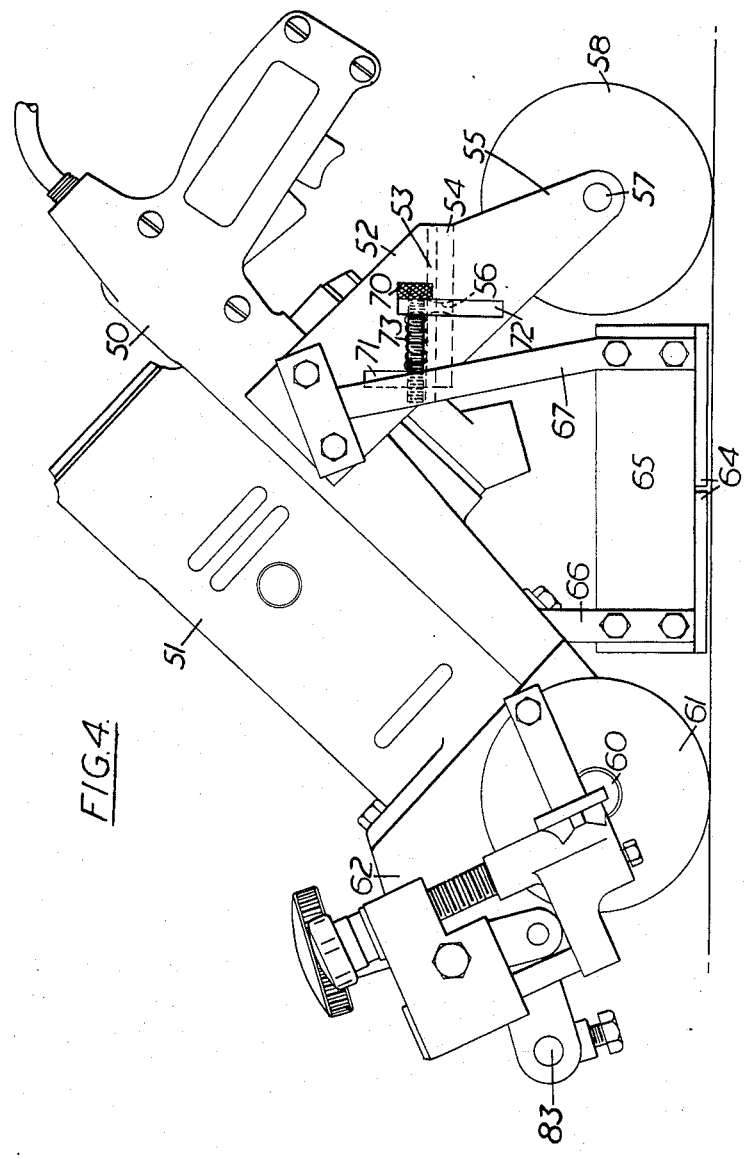

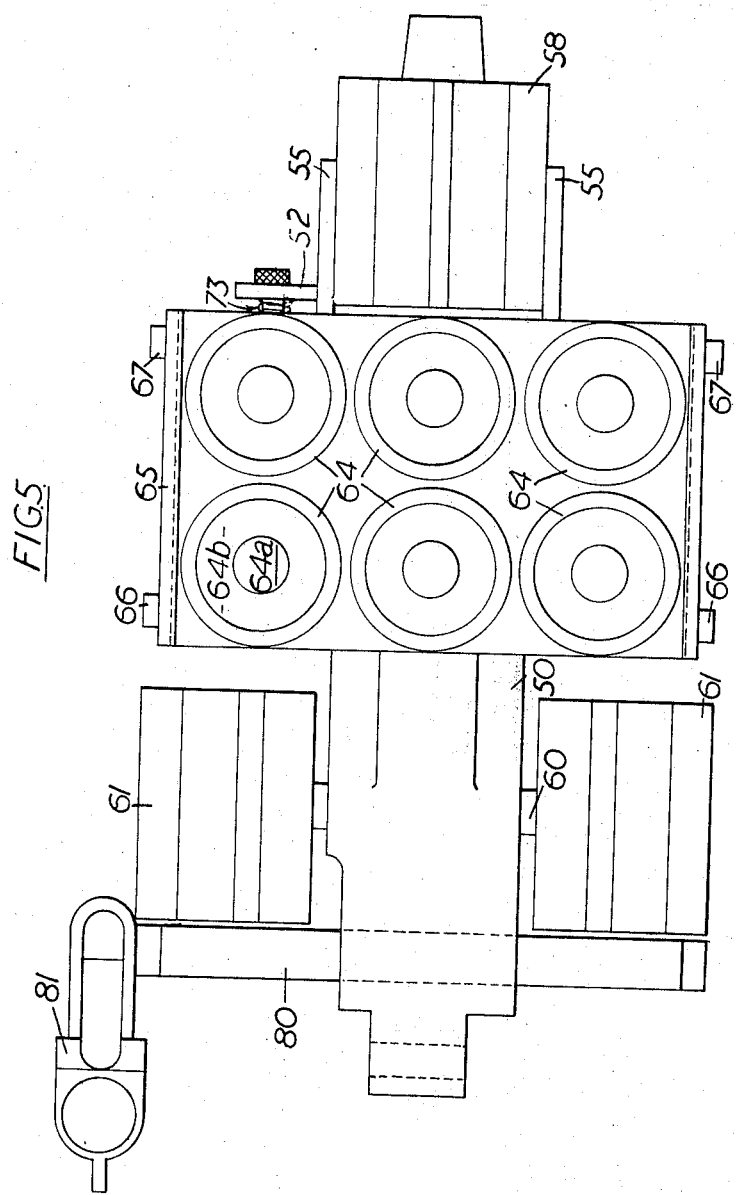

United States Patent Office 3,249,733
Patented May 3, 1966

3,249,733
ELECTRO-SLAG WELDING APPARATUS
Philip D. Santilhano, London, England, assignor to Babcock & Wilcox, Limited, London, England, a corporation of Great Britain
Filed Dec. 20, 1963, Ser. No. 332,191
Claims priority, application Great Britain, Dec. 21, 1962, 48,429/62; Mar. 20, 1963, 11,067/63
20 Claims. (Cl. 219—126)

This invention relates to electro-slag welding and is especially concerned with apparatus for use in such a welding process.

Electro-slag welding is a process in which a welded seam is made by the deposition of weld metal in an upright gap between two surfaces. In the process, the tip of the welding electrode is buried in slag lying on top of previously deposited weld metal, pressure pads being provided at the front and back of the seam to contain the slag and the molten weld metal until the latter has solidified. When the arc is struck at the beginning of the process, the lower part of the slag layer becomes molten and the weld metal is subsequently deposited at the bottom of the molten slag layer by the passage of current through the electrode and the molten slag.

The process lends itself to the continuous welding even of extensive seams simply by raising the electrode, as weld metal is deposited, at a rate sufficient to maintain an adequate separation between the end of the electrode and the deposited metal. This requires, however, that the welding nozzle should move continuously in the desired relationship with the gap in which the weld metal is to be deposited and it is customary practice to erect a guide-way alongside the seam but separated from the work and to propel along the guide-way means by which a welding nozzle is carried. In this arrangement, difficulties tend to arise in constructing such a guide-way that provides a sufficiently accurate control of the position of the welding nozzle throughout the length of the seam and an object of the present invention is to avoid the need for providing such a guide-way.

According to the present invention, there is provided electro-slag welding apparatus suitable for use in welding a seam between work pieces of magnetic material, the apparatus including a carrier for supporting a welding nozzle, and magnetic holding means mounted on the carrier and such as to provide several magnetic members arranged to co-act with the work simultaneously to locate the carrier laterally relatively to the seam during movement of the carrier lengthwise of the seam.

The magnetic holding means may be adapted to support the carrier from the work during movement of the carrier and in such a case the carrier may be provided with a motor to impel the carrier.

In other embodiments of the invention, the means for impelling the carrier may be provided externally of the carrier and the magnetic holding means may serve in governing the rate at which the carrier moves under the action of the impelling means.

By way of example, embodiments of the invention will now be described with reference to the accompanying drawing in which:

FIGURE 2 is a view from the left of FIGURE 1, some of the details shown in FIGURE 1 being omitted for the sake of clarity;

FIGURE 3 is a detail of FIGURE 2;

FIGURE 4 shows in side view further apparatus for use in electro-slag welding; and FIGURE 5 shows a view from below of the apparatus shown in FIGURE 4.

Figure 1:
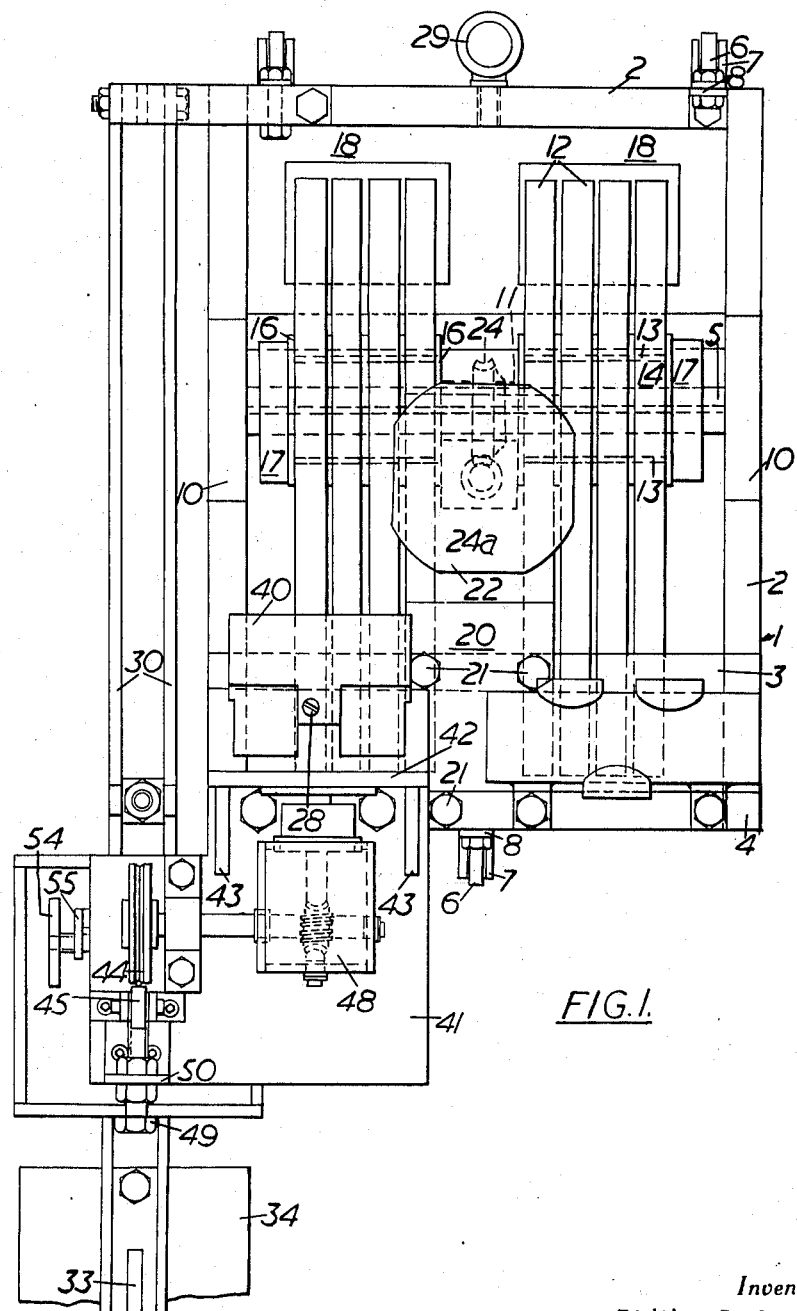
FIGURE 1 shows, in front view, apparatus for use in electro-slag welding.

As is shown in FIGURES 1 and 2, the electro-slag welding apparatus includes a carrier, indicated generally at 1, the base of which is a rectangular frame 2 formed from bars of square cross-section. Two bridges, 3 and 4 respectively, extend across the rear end of the frame 2 and a cross-strut 5 is provided forwardly of the centre line of the frame 2. Three wheels 6, which project slightly below the frame 2, are mounted on the frame 2. Two of the wheels 6 lie at the leading end of the frame 2 and one at the trailing end. Each wheel 6 is rotatable in a bracket 7, the trailing, and one of the leading, brackets 7 being bolted to strips 8 extending perpendicularly to the frame 2 and the other leading bracket 7 being bolted to a pillar 9 similarly extending perpendicularly to the frame 2.

Two supports 10 also extend perpendicularly to the frame 2, slightly forwardly of the centre line of the frame 2, and a shaft 11 is journalled at its ends into the supports 10. The shaft 11 passes through eight aligned U-shaped members 12 of mild steel, the shaft 11 lying slightly forwardly of the centre line of each of the members 12. The opening in each member 12 through which the shaft 11 passes is circular and lined by a bush 13, and, for each member 12, a circular disc 14 is fixed to the shaft 11 to rotate within the bush 13. Each of the discs 14 is rigidly fixed eccentrically on the shaft 11, the phase of the eccentricity of any disc 14 being opposite to that of the, or either, adjacent disc 14. The arrangement of the eccentricity of the discs 14 is indicated in the detail of FIGURE 3 and when the discs 14, and the members 12 with which they are associated, are in the relative positions in which they are shown in FIGURE 3, the free ends of the limbs of every alternate member 12 lie beyond the plane along which the wheels 6 roll. The free ends of the leading limbs of the other members 12 lie in a plane above this plane. When the discs 14 have been rotated through 90° from the positions in which they are shown in FIGURE 3, the free ends of the limbs all lie in a plane lying slightly forwardly of the plane along which the wheels 6 roll.

The members 12 are arranged in two groups of four and a worm wheel 24 is fixed to the shaft 11 between the groups. Each of the discs 14, and the members 12 with which they are associated, is flanked by washers 16 and end rings 17 are interposed between the endswashers 16 and the supports 10. The leading limbs of the members 12 extend through electric coils 18, two coils 18 being provided and associated one with each group of four members 12. When current flows through the coils, the members 12 become magnetised, the leading limbs of all the members 12 having the same polarity.

A plate 20 is bolted at 21 across the bridges 3 and 4 and extends forwardly to a position above the shaft 11. A hydraulic motor 22 is mounted on the plate 20 and a driving shaft 23 projecting from the hydraulic motor 22 carries a worm 24a that co-operates with the worm wheel 24.

The apparatus described so far forms a unit that will cling to the work being welded magnetically and which can be moved along the work by means of the motor 22. At the beginning of the process of welding a seam, the coils 18 of the apparatus that has been described are energised to magnetise the members 12. The shaft 11 is turned slightly so that the feet of all the members 12 lie in the same plane and the feet are then brought into contact with the magnetic work to the right of the seam to be welded with the apparatus orientated as is shown in FIGURE 1. Strong magnetic contact will be made with the work despite any possible irregularities in the surface of the work since contact may be made at each of the sixteen feet of the laminae. To permit still further compensation for any irregularities in the surface of the work, there may be a little play between each bush 13 and the disc 14 that rotates within it.

To propel the carrier along the seam, the motor 22 is operated to rotate the shaft 11 through the worm 24a. This will move four of the members 12, i.e. one group of alternate members, away from the work and restore them to contact with the work at a position forwardly of the other four members 12 that have meanwhile remained in contact with the work. These will then be removed from the work by further rotation of the shaft 11 and restored to contact with the work at a position forwardly of the others. Thus, each set of alternate members 12 alternately supports the apparatus from the work whilst the other set of alternate members 12 moves forwardly. During the forward movement of any set of members 12, the frame 2 and all the components that are fixed to it also move forwardly. Due to the disposition of the weight of the frame 2, it will tilt slightly during the forward movement of each set of members 12 so that the front wheels 6 are clear of the work and the rear wheel 6 rolls in contact with the work. Similarly, during the forward movement of any set of members 12, those members will tilt, since the shaft 11 lies forwardly of their centre line, and the rear feet will slide over the work.

Means including the brass screw 28 is provided for steering the carrier. The screw 28 passes through the rear limb of one of the members 12 and similar brass screws could be provided in each or any of the rear limbs of the other members 12. The projection of the screw 28 ensures a gap between the limb of the member 12 and the work and so reduces the attraction between the member and the work. By adjusting the projection of the screw 28, the attraction can be varied and the difference between the magnetic attractions on each side of the centre line of the carrier will create a steering effect.

A differential attractiveness could alternatively be obtained by connecting a rheostat in series with each of the coils 18 and by adjusting the rheostats relatively to each other, the magnetic induction of one coil relatively to the other may be varied.

A counterweight (not shown) is connected to the frame 2 by means of a cable connected to the frame 2 at the ring 29 and passing over a pulley to the counterweight. The counterweight should just balance the weight of the apparatus so that should the current to the coils 18 fail, the apparatus will slide only slowly to the ground and not fall heavily.

In a modification, however, the counterweight could serve to pull the apparatus along the seam. The motor 22 would not then be effective in driving the apparatus but would control the rate of oscillation of the members 12 which would thus govern the rate at which the apparatus moved along the seam.

FIGURES 1 and 2 show not only the carrier 1 but the parts of the slag welding apparatus that are carried by the carrier 1 longitudinally of the seam. These include means for feeding the electrode wire to the seam and means for containing slag and weld metal within the seam whilst they are still molten.

The means for containing the slag includes the two pairs of bars 30 and 31 pivotally suspended one each side of the seam from a strut 32 fixed to the front end of the carrier 1 and extending through the seam. At their lower ends, each of the pairs of bars is provided with a tongue, 33, lying loosely in a recess in a pressure pad 34, the pressure pads 34 being arranged to abut the seam in the region of the weld to contain the molten material. The inclination of each of the pads 34 on the tongues 33 may be adjusted by the screws 35. A brace 36 extends between the pairs of bars 30 and 31 and by tightening the nut 37 at one end of the brace 36, the pressure which the pads 34 exert on the seam can be adjusted.

A second hydraulic motor 40 is provided on the carrier for feeding electrode wire to the welding zone. A plate 41 is bolted across the bridges 3 and 4 and the motor 40 is bolted to a plate 42 extending perpendicularly to the plate 41 and braced by the brackets 43. Feed wheels 44 and 45 are mounted respectively on brackets 46 and 47 connected to the plate 41 in alignment with the seam to be welded and the wheel 44 is driven from the motor 40 through the worm and worm wheel arrangement indicated at 48. The bracket 46 is rigidly fixed to the plate 41 and the bracket 47 is pivoted. A screw 49 acting on the bracket 47 passes through a bracket 50 fixed to the plate 41 and by turning the screw 49, the pressure exerted by the wheels 44 and 45 on the wire passing between them can be adjusted.

From the wheels 44 and 45, the wire is lead through a nozzle 51 to the welding zone. The nozzle 51 passes through a support 52 that is slidable in the groove of a grooved member 53 fixed to the plate 41. A turnscrew 54 that is threaded through a flange 55 connected to the member 53 enables the position of the support 52 along the grooves, and thus the position of the nozzle 51, to be adjusted.

It will be realised that, as the carrier rocks the nozzle 51 will oscillate. If it is preferred to avoid this oscillation, the ends of the shaft 11 could be mounted in bounded rubber so that the shaft would rock relatively to the carrier and the carrier would move evenly.

The carrier shown in FIGURES 4 and 5 differs from that shown in FIGURES 1 to 3 essentially in that it includes magnetic members that are fixed relatively to the body and rollers are provided for rolling continuously over the work.

The body includes the inclined spine 50 on which is mounted an electric motor 51. Two brackets 52 extend parallel to each other perpendicularly to the spine 50 and are connected together at their outer ends by a plate 53. A stirrup formed by a cross plate 54 and two side plates 55 is connected by the pivot indicated at 56 to the plate 53 so that the plates 53 and 54 are parallel to each other. A spindle 57 extends between the outer ends of the side plates 55 and a magnetic roller 58, covered in a silicon rubber tyre, is mounted on the spindle 57.

A spindle 60 extends through the leading end of the spine 50 and two further magnetic rollers 61 each covered in silicon rubber tyre are respectively mounted one on each end of the spindle 60. The spindle 60 is provided with a worm wheel (not shown) which is driven from the motor 51 through gearing in the gear box 62.

Six pot-type electro-magnets 64 are fixedly mounted in a rack 65 slung beneath the spine 50, the leading end of the rack 65 being connected to the spine 50 by the strips 66 and the trailing end being connected to the brackets 52 by the strips 67. The rack 65 is thus rigidly fixed relatively to the spine 50 and the magnets 64 are separated from the plane along which the rollers 58 and 61 roll by about one eighth of an inch. Each magnet has a steel core 64a surrounded by a winding 64b within an inverted pot of mild steel and the force which each magnet exerts on the work across the gap is about 100 pounds.

To use the carrier shown in FIGURES 4 and 5, the coils 64b are energised and the carrier is brought into contact with a workpiece of magnetic material at one side of a seam along which the workpiece is to be welded to a further workpiece. It will be held in position by the attraction exerted by the wheels 58 and 61 and the electromagnets 64 and prevented from rolling down the work by the meshing of the gears in the box 62. The motor 51 is then switched on to drive the leading wheels 61, through the gear box 62, to cause the carrier to progress along the work.

To steer the carrier, the orientation of the rear wheel 57 may be varied about the pivot 56. To control the orientation, a turnscrew 70 is screwed into bracket 71 fixed to the bracket 52. The turnscrew 70 passes freely through an opening in bracket 72 fixed to one of the side plates 55 and a coiled spring 73 extending along the turnscrew 70 acts on the brackets 71 and 72 and forces them apart until the bracket 72 abuts the head of the turnscrew 70.

The apparatus that is supported by the carrier is mounted on the bar 80 that extends across the front end of the spine 50. The means for preventing molten slag and weld metal from escaping from the seam is similar to that shown in FIGURES 1 and 2 and is connected to the bracket 81 on the bar 80. The means for feeding the welding electrode may also be similar but could be mounted on the arms by which the pressure pads are supported instead of being connected to the bar 80.

The front end of the carrier is provided with a loop 83 by which the carrier may be connected to a cable passing over a pulley to a counterweight. The counterweight could serve simply to prevent the carrier from falling quickly should the current to the electromagnets 64 fail. It could, however, serve to provide the driving force for moving the carrier along the work in which case the motor 51 would serve to control the rate of progress.

In a modification of the embodiment shown in FIGURES 4 and 5, the electro-magnets 64 are disposed at the sides of the rollers 58 and 61. In this way, any danger that the magnets would make contact with the work, due to irregularities in the work surface, is reduced since the rollers will roll over any bumps in the surface and raise the electro-magnets clear of the bumps at the same time.

It will be realised that in both the embodiments described, when the force impelling the carrier is derived from a counterweight, the magnetic attraction between the carrier and the work need be less than when the entire weight of the carrier is supported by the attraction although, of course, it must be sufficient to locate the carrier laterally relatively to the seam.

I claim:

1. Electro-slag welding apparatus for use in welding a seam between work pieces of magnetic material comprising a carrier, a welding nozzle supported by the carrier, driving means associated with the carrier for moving the carrier lengthwise of the seam, and magnetic holding means mounted on the carrier and adapted to support the carrier from the work during movement of the carrier and to coact with the work to locate the carrier laterally relative to the seam during movement of the carrier lengthwise of the seam, said magnetic holding means including magnetic members movable relative to the carrier and forming part of the driving means for the carrier.

2. Apparatus as claimed in claim 1, in which the magnetic members serve in governing the movement of the carrier lengthwise of the seam.

3. Apparatus as claimed in claim 1, in which the carrier is adapted to be driven by a force derived externally of the carrier, and a motor is provided to determine the rate of movement of the movable magnetic members and thereby govern movement of the carrier lengthwise of the seam.

4. Apparatus as claimed in claim 1, in which the magnetic holding means provides two magnetic holding units each providing several magnetic members arranged to coact with the work simultaneously and of which at least the first unit is capable of limited movement rotatively to the carrier in the fore-and-aft direction of the carrier, and sequence control means is provided whereby cyclically, during forward movement of the carrier along the work, the magnetic attraction between the second unit and the work is reduced, the second unit and the carrier are moved in the forward direction relatively to the first unit, the magnetic attraction between the second unit and the work is restored in a position forwardly of that which it occupied when the magnetic attraction between them was reduced, the magnetic attraction between the first unit and the work is reduced, the first unit is moved in the forward direction and the magnetic attraction between the first unit and the work is restored in a position forwardly of that which it occupied when the magnetic attraction between them was reduced.

5. Apparatus as claimed in claim 4, is which each holding unit is capable of limited movement relative to the carrier in the fore-and-aft direction, and the sequence control means is such that the carrier is moved in the forward direction with each movement in the forward direction of either of the holding units.

6. Apparatus as claimed in claim 1, in which the magnetic holding means provides two magnetic holding units, each of which is provided with a plurality of magnetic members arranged to make contact with the work simultaneously and each of which is capable of limited movement relative to the carrier in the fore-and-weft direction, sequence control means is provided to oscillate the holding units cyclically whereby, during forward movement of the carrier along the work, repeatedly first the magnetic members of the first holding unit are given motion from and towards the work while the first holding unit is given motion in a forward direction along the seam, the second holding unit remaining stationary, and then the magnetic members of the second holding unit are given motion away from and towards the work while the second holding unit is given motion in a forward direction along the seam, the first holding unit remaining stationary.

7. Apparatus as claimed in claim 4, in which the driving means includes a motor mounted on the carrier and arranged to drive the sequence control means.

8. Apparatus as claimed in claim 6, in which the carrier is arranged to make contact with the work at locations lying in a plane and movement relative to the carrier of any magnetic member included in a holding unit is provided by means of a cam surface in the form of a disc mounted eccentrically on bearings fixed relatively to the carrier and rotating in a circular opening in the magnetic member with the relationship between the disc and the opening being such that during part of the rotation of a disc, the magnetic member associated with the disc is urged into contact with the work.

9. Apparatus as claimed in claim 4, in which the magnetic members of each holding unit are connected to a common support with such play that each is capable independently of the others of limited free movement in a direction perpendicular to the work.

10. Apparatus as claimed in claim 9, in which the magnetic members of each holding unit alternate transversely of the carrier with the magnetic members of the other holding unit.

11. Apparatus as claimed in claim 6, in which each magnetic member is associated with an eccentrically mounted disc, the discs are all fixed to a common shaft and the phase of any disc is opposite to that of the adjacent disc.

12. Apparatus as claimed in claim 4, in which the magnetic members of the holding units are each electromagnetic.

13. Apparatus as claimed in claim 12, in which each of the magnetic members that is movable is provided by magnetic material extending through, and movable within, an electrical winding that is fixed relatively to the carrier.

14. Apparatus as claimed in claim 1, in which the magnetic holding means includes magnetic rollers on which the carrier is mounted and adapted to roll over the surface of the work and further magnetic members mounted on the carrier so as to be spaced from the work when the rollers roll over the work.

15. Apparatus as claimed in claim 14, in which the rollers are spaced in the fore-and-aft direction of the carrier and the fixedly mounted magnetic members lie between the leading and the trailing rollers.

16. Apparatus as claimed in claim 14, in which the rollers are spaced in the fore-and-aft direction of the carrier and the fixedly mounted magnetic members are aligned with the axes of rotation of the rollers.

17. Electro-slag welding apparatus as claimed in claim 1, in which pressure pads are mounted on the carrier and bear against the front and the rear of the seam.

18. Electro-slag welding apparatus as claimed in claim 17, in which the pressure pads are carried by arms, arranged to lie respectively at the rear and the front of the seam, and tie members, adapted to lie in the gap in which weld metal is to be deposited, connect the arms together.

19. Electro-slag welding apparatus as claimed in claim 18, in which the pressure pads are pivotally mounted one on each arm and means are provided for adjustably tilting the pads downwardly toward the seam.

20. Electro-slag welding apparatus as claimed in claim 18, in which each arm is provided by two parallel rods and the welding nozzle lies between the two rods of one arm.

References Cited by the Examiner
UNITED STATES PATENTS

| | | | |
|---|---|---|---|
| 1,867,979 | 7/1932 | Mayoh | 219—126 |
| 2,395,723 | 2/1946 | Chmielewski | 219—137 |
| 2,755,367 | 7/1956 | Costello | 219—126 |
| 2,805,321 | 9/1957 | Cadwell | 219—126 |
| 2,866,078 | 12/1958 | Ballentine et al. | 219—126 |
| 2,960,053 | 11/1960 | Meyer | 219—126 |

RICHARD M. WOOD, *Primary Examiner.*